(12) United States Patent
Li

(10) Patent No.: US 8,527,489 B1
(45) Date of Patent: Sep. 3, 2013

(54) SUGGESTING A SEARCH ENGINE TO SEARCH FOR RESOURCES

(75) Inventor: Youlin Li, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/414,364

(22) Filed: Mar. 7, 2012

(51) Int. Cl.
*G06F 7/00* (2006.01)
*G06F 17/30* (2006.01)

(52) U.S. Cl.
USPC .......................................................... 707/706

(58) Field of Classification Search
USPC .................. 707/706–708, 722, 765
See application file for complete search history.

(56) References Cited

U.S. PATENT DOCUMENTS

| | | | |
|---|---|---|---|
| 2007/0038601 A1* | 2/2007 | Guha | 707/3 |
| 2010/0281012 A1* | 11/2010 | Imig et al. | 707/708 |
| 2012/0130978 A1* | 5/2012 | Li et al. | 707/706 |
| 2012/0191745 A1* | 7/2012 | Velipasaoglu et al. | 707/767 |
| 2012/0278159 A1* | 11/2012 | Kumar et al. | 705/14.42 |

* cited by examiner

*Primary Examiner* — Robert Beausoliel, Jr.
*Assistant Examiner* — Nicholas Allen
(74) *Attorney, Agent, or Firm* — Fish & Richardson P.C.

(57) ABSTRACT

Methods, computer-readable media, and systems for suggesting a search engine to search for resources. Multiple search results determined by a first search engine as satisfying multiple first search queries are received and displayed in a user interface. That the search results received from the first engine do not satisfy an informational need of a user that input the search queries is determined. In response, a suggestion to provide a similar search query to a second search engine is displayed in the user interface.

30 Claims, 7 Drawing Sheets

SUGGESTING A SEARCH ENGINE TO SEARCH FOR RESOURCES

BACKGROUND

This document relates to receiving search queries and providing search results.

A search engine includes one or more computers that receive a search query (for example, a text query from a user device), and, in response, identify resources that satisfy the search query. The search engine provides search results that identity the resources to the user device, which then displays the results in a display device. The quality of search results, defined in some instances in terms of precision and recall, can be affected in part by the specificity of search queries that the search engine receives from the user device and in part by the search methods that the search engine implements.

From the perspective of a user who has provided a search query to a search engine, the relevance of the resources identified by the search engine to the user's informational need can represent a quality of the performance of the search engine. Often, the user may need to periodically refine the search query provided to the search engine so that the search engine can identify more relevant resources. If the resources identified by the search engine do not satisfy the user's informational need, particularly despite periodic refinement, then the user may become frustrated with the search engine.

SUMMARY

This document describes technologies relating to suggesting a search engine to search for resources.

One innovative aspect of the subject matter described here can be implemented as a computer-implemented method. It is determined at a user device that one or more first search queries received in a user interface during a search session are provided to a first search engine. It is further determined at the user device that for each of the one or more first search queries, multiple respective search results determined by the first search engine as satisfying the respective first search queries are displayed in the user interface. It is also determined at the user device that the respective search results determined by the first search engine as satisfying the respective first search queries do not satisfy an informational need of a user that input the one or more first search queries at the user device. In response to determining that the respective search results determined by the first search engine do not satisfy an informational need, a suggestion to provide a second search query that is based on one or more of the first search queries to a second search engine is displayed in the user interface.

This, and other aspects, can include one or more of the following features. Determining that the respective search results determined by the first search engine as satisfying the respective first search queries do not satisfy an informational need can include determining an absence of a selection of any of the respective search results determined by the first search engine. Determining the absence of the selection of any of the respective search results displayed in the user interface can include detecting an absence of a selection of any of multiple identifiers displayed in the user interface. An identifier can be included in each search result and can reference a resource determined by the first search engine as satisfying the first search query. Displaying a suggestion to provide the second search query to the second search engine can include displaying the second search query in the user interface, and displaying a message in the user interface that states that selection of the second search query will result in the second search query being provided to the second search engine. Displaying a suggestion to provide the second search query to the second search engine can include displaying the second search query in the user interface as a selectable hyperlink such that a selection of the hyperlink causes the second search query to be provided to the second search engine. Displaying a suggestion to provide the second search query to the second search engine can include displaying, in the user interface, the second search query and a third search query that is based on the first search queries, and displaying, in the user interface, a message that asks if either the second search query or the third search query may be provided to the second search engine. The third search query can be different from the second search query. Each of the second search query and the third search query can be displayed as a respective selectable hyperlink such that a selection of the hyperlink causes the respective search query to be provided to the second search engine. The second search query and the third search query can be obtained from a database of search queries stored on the user device. Input can be received to accept the suggestion to provide the second search query to the second search engine, in response to receiving the input, the second search query can be provided to the second search engine, and multiple search results received from and determined by the second search engine as satisfying the second search query can be displayed in the user interface. The multiple respective search results determined by the first search engine as satisfying a first search query can be displayed simultaneously in the user interface with the plurality of search results received from and determined by the second search engine as satisfying the second search query. The second search query can be the same as one of the first search queries.

Another innovative aspect of the subject matter described here can be implemented as a computer-readable storage medium storing computer program instructions executable by data processing apparatus to perform the computer-implemented methods described above. A further innovative aspect of the subject matter described here can be implemented as a system including data processing apparatus and a computer-readable storage medium storing computer program instructions executable by the data processing apparatus to perform the computer-implemented methods described above.

Particular implementations of the subject matter described in this specification can be implemented so as to realize one or more of the following potential advantages. By implementing the techniques described below, it can be determined that an informational need of a user searching for resources using a first search engine is not being satisfied. In response, an alternative second search engine, which may be able to better identify resources that satisfy the user's informational need, can be suggested to the user. In some situations, a computer software application executed by the user device or by the second search engine can determine that the user is frustrated with the first search engine, and suggest the second search engine. The user can be presented with a suggestion to provide the same search query that the user provided to the second search engine. Alternatively, or in addition, the user can be presented with a search query similar to the one that the user provided to the first search engine for providing to the second search engine. Further, both sets of search results provided by the first search engine and the second search engine can be displayed in the user interface allowing the user to compare the resources included in both sets. In this manner, a user's search experience can be improved.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
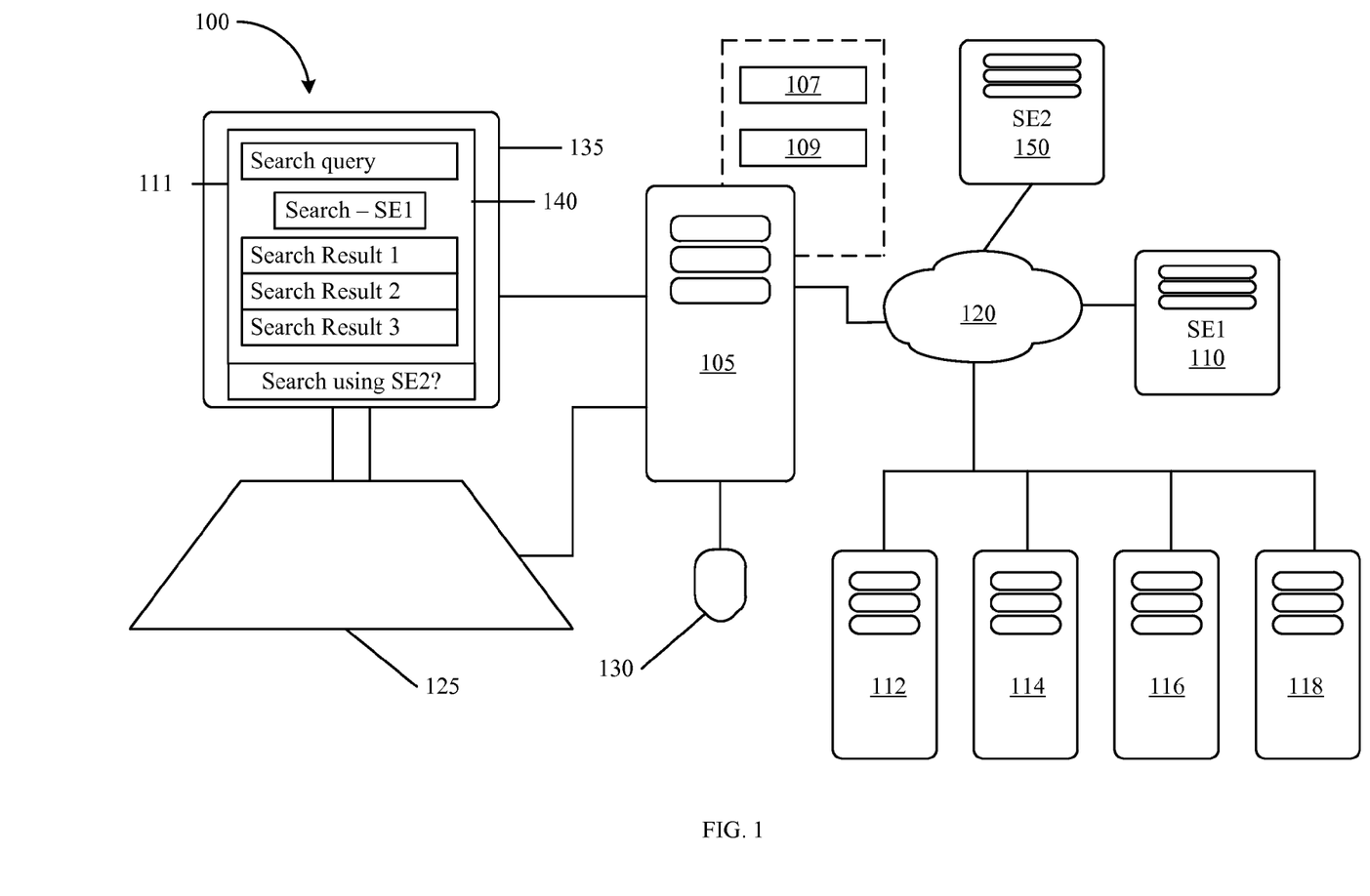
FIG. 1 illustrates an example of an environment including two search engines, each of which provides search results.

FIG. 1 illustrates an example environment 100 including two search engines (a first search engine 110 and a second search engine 150), each of which provides search results in response to receiving search queries. The environment 100 includes a user device 105 (for example, a computer system), which can include data processing apparatus 107 and a computer-readable storage medium 109 storing computer software instructions executable by the data processing apparatus 107 to perform operations described below.

The user device 105 is connected to the first search engine 110 and the second search engine 150 through one or more wired or wireless networks 120, for example, the Internet. The user device 105, the first search engine 110, and the second search engine 150 are further connected to multiple server systems (server systems 112, 114, 116, 118) through the networks 120. Each of the multiple server systems 112-118 includes one or more computer-readable media that store resources, for example, a text resource, an audio resource, a video resource, images, and the like. Each search engine (the first search engine 110 and the second search engine 150) includes respective computers that search the resources stored on the multiple server systems (e.g., after the resources have been crawled by the search engines and indexed in respective indexes maintained by the search engines) in response to receiving search queries from the user device 105.

The user device 105 is connected to input devices (such as a keyboard 125, a mouse 130, and the like) through which the user device 105 receives user input, and a display device 135 (for example, a monitor) in which the user device 105 displays output that the user device 105 generates by processing the input. In some situations, the user device 105 receives a search query (for example, a string of characters) through a user interface 140 that the user device 105 displays in the display device 135. In response to user input to provide the search query to a search engine (for example, the first search engine 110), the user device 105 provides the received search query over the network 120 to the search engine. The user device 105 receives search results that identify resources determined by the search engine as satisfying the search query. The user device 105 displays the search results in the user interface 140.

In some implementations, the user device 105 determines that one or more search queries received in the user interface 140 during a search session are provided to the first search engine 110. The user device 105 additionally determines that multiple respective search results determined by the first search engine 110 as satisfying the respective first search queries are displayed in the user interface 140. Based on detecting actions performed or not performed by the user, the user device 105 determines that the respective search results received from the first search engine 110 do not satisfy an informational need of the user that input the one or more first search queries at the user device 105. In response to determining that the respective search results do not satisfy an informational need, the user device 105 displays a suggestion to provide a second search query that is based on one or more of the first search queries to a second search engine 150.

By implementing the techniques described here, the user device 105 can infer that the user may be frustrated with the first search engine 110 and, in response, can suggest the second search engine 150 to improve the user's search experience. In some implementations, the user device 105 can determine that the user's informational need is not being satisfied based on interactions between the user and information displayed in the user interface 135.

The techniques to determine that the user may be frustrated with the first search engine 110 and, in response, suggest the second search engine 150 to improve the user's search experience are described as being performed by the user device 105. In some implementations, computer software programs can be encoded and installed on the user device 105, for example, as toolbars, extensions, or plug-ins in Internet browsers (such as Internet Explorer™, Chrome™, Firefox™). In some implementations, a user agent that is installed on or is a portion of the user device 105 and that includes one or more data processing apparatus can execute the computer software programs to perform operations including monitoring search results received from the first search engine 110 and user actions or inactions pursuant to the presentation of the search results received from the first search engine 110, and determining that the search results do not satisfy the informational need of the user. The user agent may connect to the second search engine 115 to obtain search results but need not connect to any entity external to the user device 105 to determine the user's frustration with search results received from the first search engine 110.

Figure 2A:
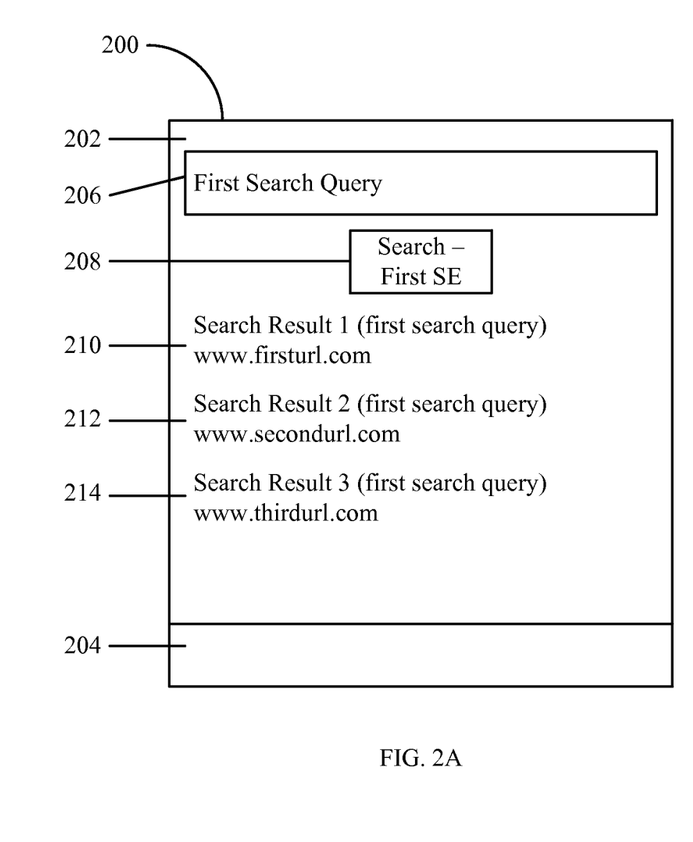
FIGS. 2A-2F are example user interfaces in which search queries are received and search results are displayed.

FIGS. 2A-2F are example user interfaces in which search queries are received and search results are displayed. FIG. 2A shows an example user interface 200 (for example, a web browser) that the user device 105 displays in the display device 135, for example, in response to receiving user input to do so. Through the user interface 200, the user device 105 can receive input to access the first search engine 110. For example, the user interface 200 can include a control (for example, a text box) into which the user can enter an identifier (for example, a Uniform Resource Locator (URL)) that references a website hosted by the first search engine 110. Upon receiving the identifier, the user device 105 can transmit a request to the first search engine 110, and render, in the user interface 200, a web page (for example, a home page) of the website hosted by the first search engine 110.

This stage can represent a beginning of a search session with the first search engine 110. Because the user device 105 has not provided search queries to or has not received search results from the first search engine 110, and has not detected any user action (or lack thereof) pertaining to the search results, the user device 105 has not yet made a determination about whether or not the user's informational need has been satisfied.

In some implementations, the user device 105 can render the web page in a first section 202 of the user interface 200. In the web page, the user device 105 can display controls (for example, a first control 206, a second control 208) supporting functionality to receive and provide search queries to the first search engine 110, and to display search results provided by the first search engine 110, respectively. The user device 105 can additionally render the user interface 200 to include a second section 204 in which the user device 105 can display a suggestion to provide a search query to the second search engine 150.

The user device 105 can display a first search query received from the user in the control 202, and subsequently detect a selection of the control 208 (for example, a "Send" or "Search" or "Transmit" button), which is an input to provide the first search query to the first search engine 110. The first search engine 110 receives the first search query from the user device 105 and identifies resources that satisfy the first search query. The first search engine 110 then generates search results, each of which references one of the identified resources, and provides the search results to the user device 105. The user device 105 receives and displays the search results (for example, a first search result 210, a second search result 212, a third search result 214) in the first section 202 of the user interface 200.

Specifically, the user device 105 can display each search result as a selectable hyperlink that includes a reference to a resource that the first search engine 110 has determined as satisfying the first search query. If the user device 105 detects a selection of a search result, then the user device 105 can transmit a request for the corresponding resource to the server system on which the resource is stored. In situations in which a number of search results provided by the first search engine 110 are too many to display in the first section 202, the user device 105 can distribute the search results across multiple web pages, one or more of which are accessible from any of the web pages.

At this stage, the user who provided the first search query can perform one of several search-related actions. For example, the user can select one of the search results displayed in the first section 202. The user can alternatively not select any of the search results. Instead, the user can provide input to access another web page in which other search results are displayed. The user can provide another search query in the first control 202, which other search query may or may not be based on the first search query. The user can provide input to access the website of the second search engine 150. The user device 105 can determine that the search results received from the first search engine 110 do not satisfy the user's informational need based on one or more of the search-related actions that the user performs.

Figure 2B:
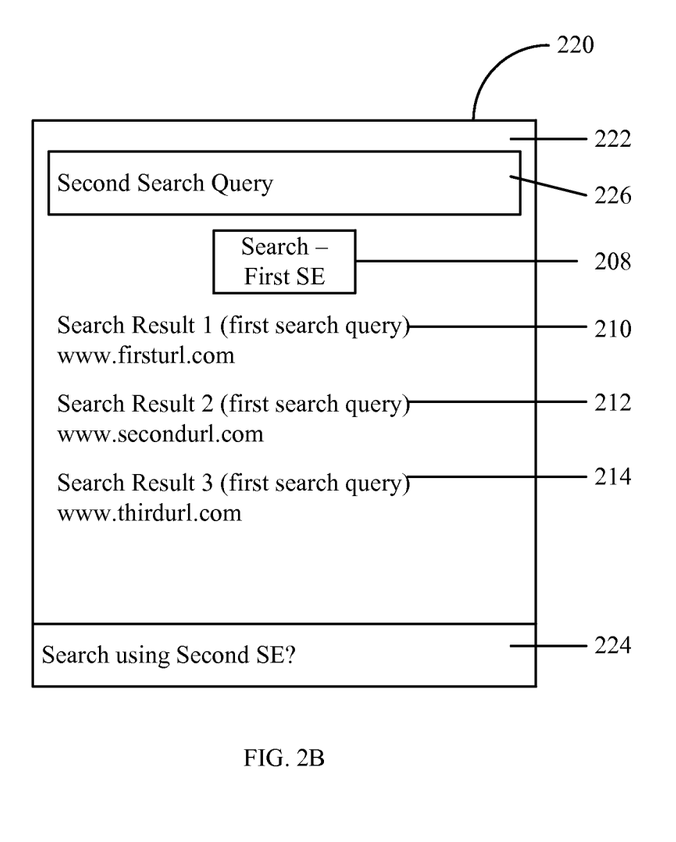

In one example situation described with reference to FIG. 2B, the user device 105 can determine that the user does not select any of the search results that the user device 105 displays in the user interface 200. The user device 105 can additionally detect a selection of one or more other web pages across which the search results are distributed, and determine that the user does not select any of the search results in any of the one or more other web pages. For example, the user device 105 determines that the user does not select any of the selectable hyperlinks that represent respective search results displayed in the user interface 220. Alternatively, the user device 105 determines that even if the user selected one or more hyperlinks to access resources, the user returned to the search results page within a short duration, for example, by clicking the "Back" button on the user interface, indicating that the user may not have been satisfied with the accessed resources. The user device 105 also determines that the user instead provides a second search query in the control 226.

In some implementations, based on determining an absence of a selection of any of the search results determined by the first search engine 110 as satisfying the first search query (or an absence of selection of any search results in response to N search queries in a search session, where N is greater than one), the user device 105 can determine that the search results do not satisfy the informational need of the user, and, by extension, that the user may be frustrated with the first search engine 110. In response, the user device 105 can display a suggestion to search for resources using the second search engine 150. In particular, the user device 105 can display the suggestion before receiving user input to provide the second search query to the first search engine 110.

For example, the user device 105 can display the suggestion in the section 224. The suggestion can include text (for example, "Search using second search engine?"), which can be a selectable hyperlink that references a web page of a website of the second search engine 150. If the user selects the text displayed in the section 224, then the user device 105 can provide the search query, which the user device 105 provided to the first search engine 110, to the second search engine 150. Upon receiving search results from the second search engine 150, the user device 105 can display the search results in a corresponding user interface in the same web browser window in which the user device 105 displays the user interface 220, in a different web browser window, or in a different tab in the same web browser window.

Figure 2C:
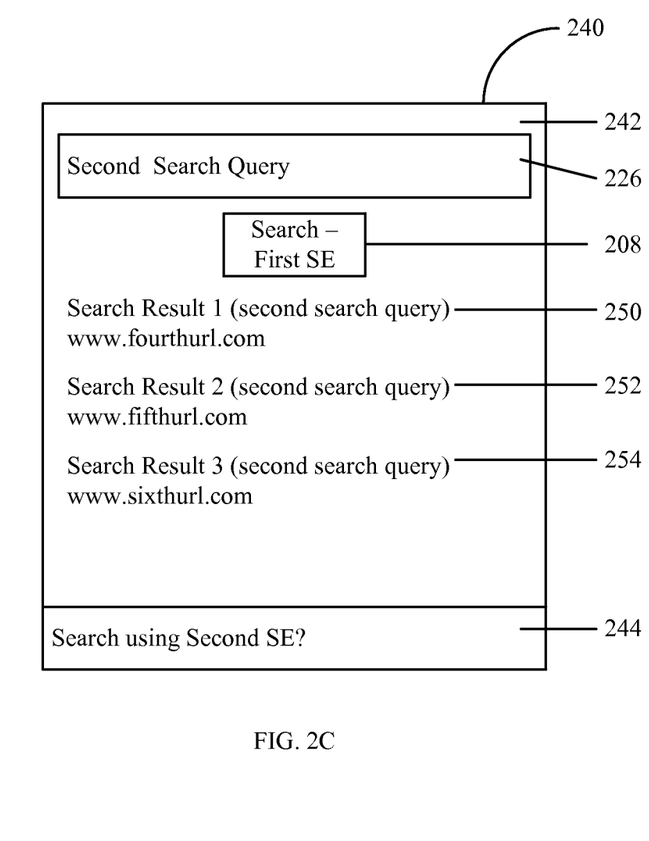

In some implementations, described with reference to FIG. 2C, the user device 105 can display the suggestion to search for resources using the second search engine 150 after displaying search results pertaining to the second search query from the first search engine 110. For example, the user device 105 can receive the second search query in the control 226 and detect a selection of the control 208 to provide the second search query to the first search engine 110. In response, the user device 105 can display multiple search results (for example, a first search result 250, a second search result 252, a third search result 254) that the user device 105 receives from the first search engine 110, and which reference resources determined by the first search engine 110 as satisfying the second search query, in the user interface 242.

The user device 105 can determine that the user provided a second search query to the first search engine 110 because the search results provided by the first search engine 110 pertaining to the first search query did not satisfy the user's informational need, and consequently, the user may be frustrated with the first search engine 110. Upon displaying the search results received from the first search engine 110 in response to providing the second search query, the user device 105 can additionally display the suggestion to search using the second search engine 150 in the section 244 in the user interface 242. In some situations, the user device 105 can display the suggestion upon detecting an absence of a selection of any of the search results displayed either in the user interface 240 or in other web pages across which the search results are displayed. In some situations, the user device 105 can display the suggestion upon receiving a third search query in the control 226.

In some situations, the user device 105 can detect that the user selected one or more search results displayed in the user interface 240, but then subsequently returned to the user interface 240, and provided a third search query that is based on the first or second search queries. From these actions, the user device 105 can determine that the resources included in the one or more search results that the user selected did not satisfy the user's informational need prompting the user to return to the web page of the first search engine 110 to search further. Consequently, the user device 105 can determine that the user is frustrated with the first search engine 110 and display the suggestion to use the second search engine 150.

In some implementations, to display the suggestion to search using the second search engine 150, the user device 105 can display a search query, which is based on one of the search queries that the user device 105 provided to the first search engine 110, in section 243 and a message in the section 244. The search query that the user device 105 displays in the section 243 can be the same as or substantially similar to the search query that the user device 105 provided to the first search engine 110. For example, the user device 105 can display the search query as a selectable hyperlink, a selection of which will cause the user device 105 to provide the search query to the second search engine 150. The message, which can also be displayed as a selectable hyperlink, can state that selection of the search query (or the message) will result in the second search query being provided to the second search engine 150.

In some implementations, the user device 105 can display the search query in a user-editable textbox, and display the message in a control, the selection of which causes the search query displayed in the textbox to be provided to the second search engine 150. In such implementations, the user can edit the search query in the textbox before providing input to provide the edited search query to the second search engine 150.

Figure 2D:
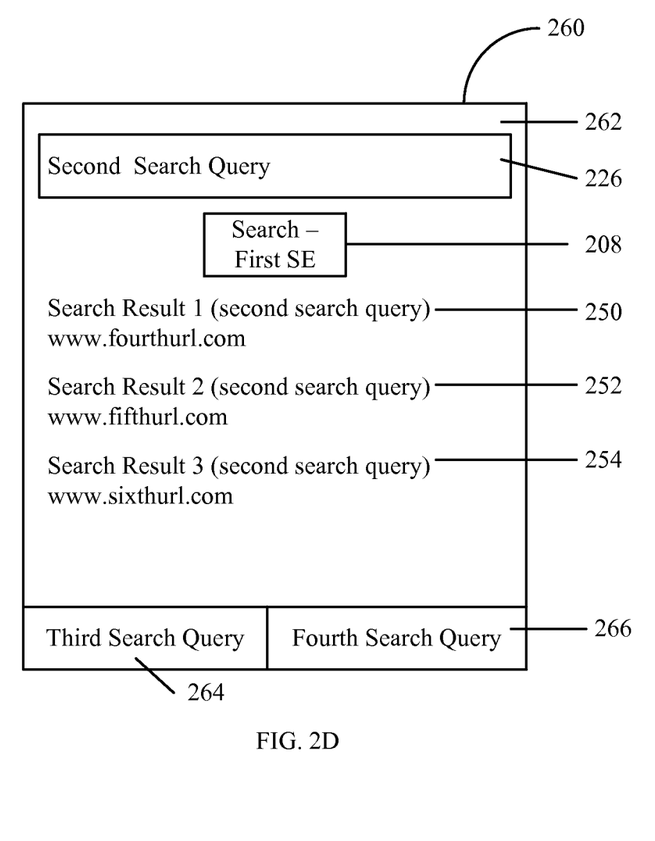

In some implementations described with reference to FIG. 2D, the user device 105 can display the search query provided to and search results received from the first search engine 110 in the section 262 of the user interface 260, and display multiple search queries (for example, a first search query, a second search query) in respective sections (for example, section 264, section 266) of the user interface 260. Each of the first and second search queries is a query that the user device 105 previously received during the search session and provided to the first search engine 110. The user device 105 can display each of the first and second search queries as a selectable hyperlink such that a selection of either hyperlink causes the respective search query to be provided to the second search engine 150.

Figure 2E:
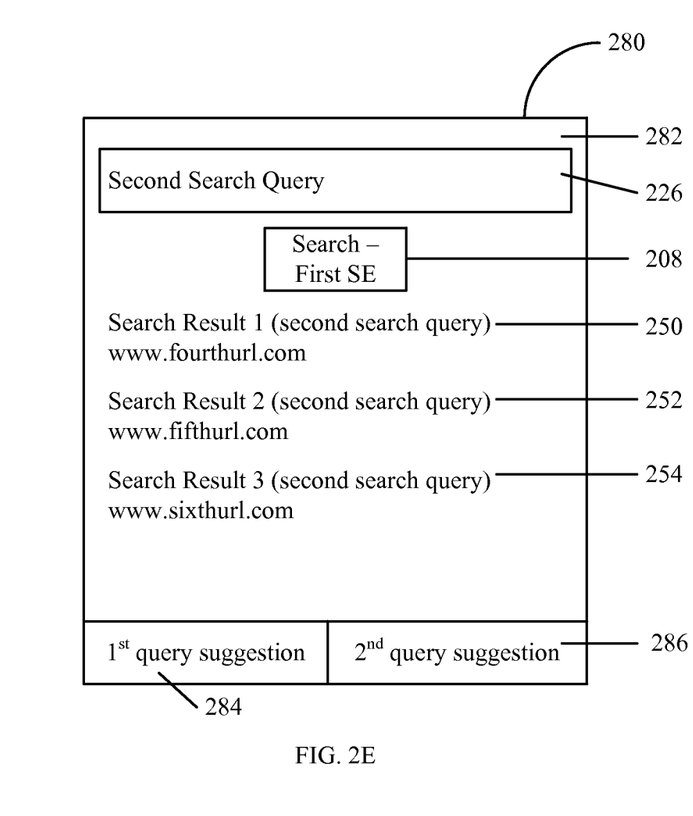

In some implementations described with reference to FIG. 2E, the user device 105 can display the search query provided to and search results received from the first search engine 110 in the section 282 of the user interface 280, and display multiple search query suggestions (for example, a first query suggestion, a second query suggestion) in respective sections (for example, section 284, section 286) of the user interface 280. As described later with reference to FIG. 4, the user device 105 can select the search query suggestions from a database of suggestions stored either on the computer-readable storage medium 109. Similarly to the search queries displayed in sections 264 and 266, the search query suggestions can be displayed as selectable hyperlinks such that a selection of the hyperlinks causes the respective search query suggestions to be provided to the second search engine 150.

Figure 2F:
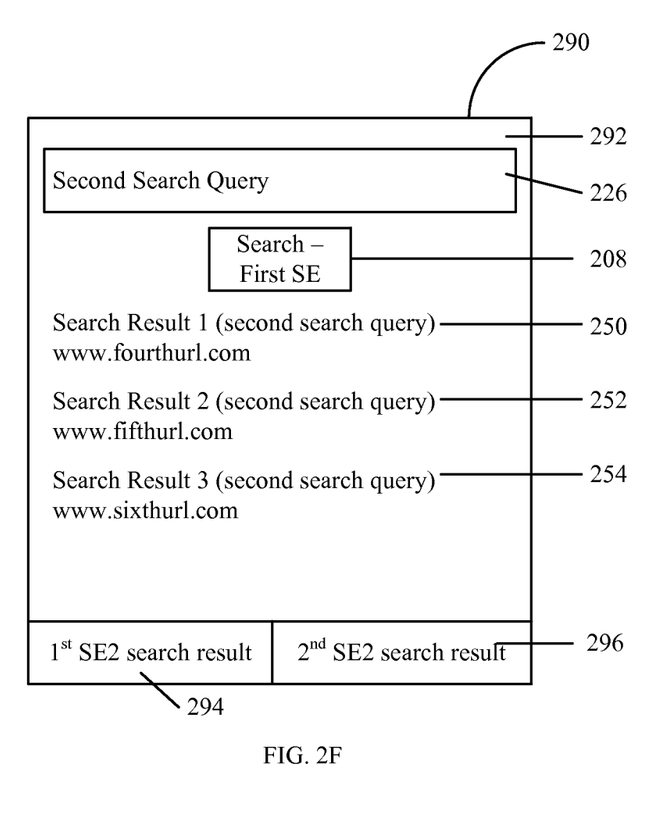

In some implementations described with reference to FIG. 2F, the user device 105 can display the search query provided to and search results received from the first search engine 110 in the section 292 of the user interface 290, and display one or more search results (for example, the first search result, the second search result) that will be provided by the second search engine 150 in response to receiving the same search query as the one provided to the first search engine 110 in respective sections (for example, section 294, section 296). In such implementations, the user device 105 solicits and receives permission from the user to provide the search query to the second search engine 150 prior to doing so. In some implementations, the user device 105 can display multiple search results that will be provided by the second search engine 150 in respective sections of the user interface 290. In some implementations, the user device 105 can receive input from the user specifying a manner of displaying the results received from the first search engine 110 and the second search engine 115. For example, the user can specify that the search results from the first search engine 110 be shown side-by-side with the search results from the second search engine 115, a number of search results received from either search engine to be shown, and the like.

When the second search engine 150 receives a search query from the user device 105, the second search engine 150 identifies search results that satisfy the received search query, and provides the requested number of search results (for example, the top ranked search results) to the user device 105. The user device 105 displays the received search results in the respective sections of the user interface 290 as selectable hyperlinks such that a selection of a search result will cause the user device 105 to access a resource referenced by the search result and to present the resource in the same or separate user interface.

Referring again to FIG. 2A, in some implementations, the user device 105 may not receive any search results from the first search engine 110, for example, because the first search engine 110 was unable to identify any search results that satisfied the first search query 206. In response, the user device 105 can suggest using the second search engine 115, as described above.

The aforementioned examples describe some techniques implementing which the user device 105 can determine that a user's informational needs are not satisfied by the first search engine 110, and consequently display a suggestion to search using the second search engine 150. Additional techniques to determine that the user's informational needs are not satisfied can include not receiving any search results from the first search engine 110. Alternatively, the user device 105 may receive too few search results from the first search engine 110. For example, the number of search results that the user device 105 receives from the first search engine 110 can be less than a threshold number (for example, five search results). Having previously obtained permission from the user, the user device 105 can provide the search query to the second search engine 115, and determine that the second search engine 115 can provide more than the threshold number of search results (for example, twenty search results) in response to receiving the search query. In such situations, the user device 105 can determine that the user's informational needs are not met, and suggest using the second search engine 115 as described above.

The user device 105 can receive input accepting the suggestion. For example, the user device 105 can detect a user-selection of the search query or the search query suggestion displayed in the user interface. In response to the input, the user device 105 can provide the search query to the second search engine 150, and display multiple search results received from and determined by the second search engine 150 as satisfying the search query in the user interface. In some implementations, the user device 105 can simultaneously display the search results received from the first search engine 110 and those received from the second search engine 150 in the user interface. For example, the user device 105 can display both sets of search results in the same user interface or within respective tabbed windows in the user interface so that the user can compare both sets.

Figure 3:
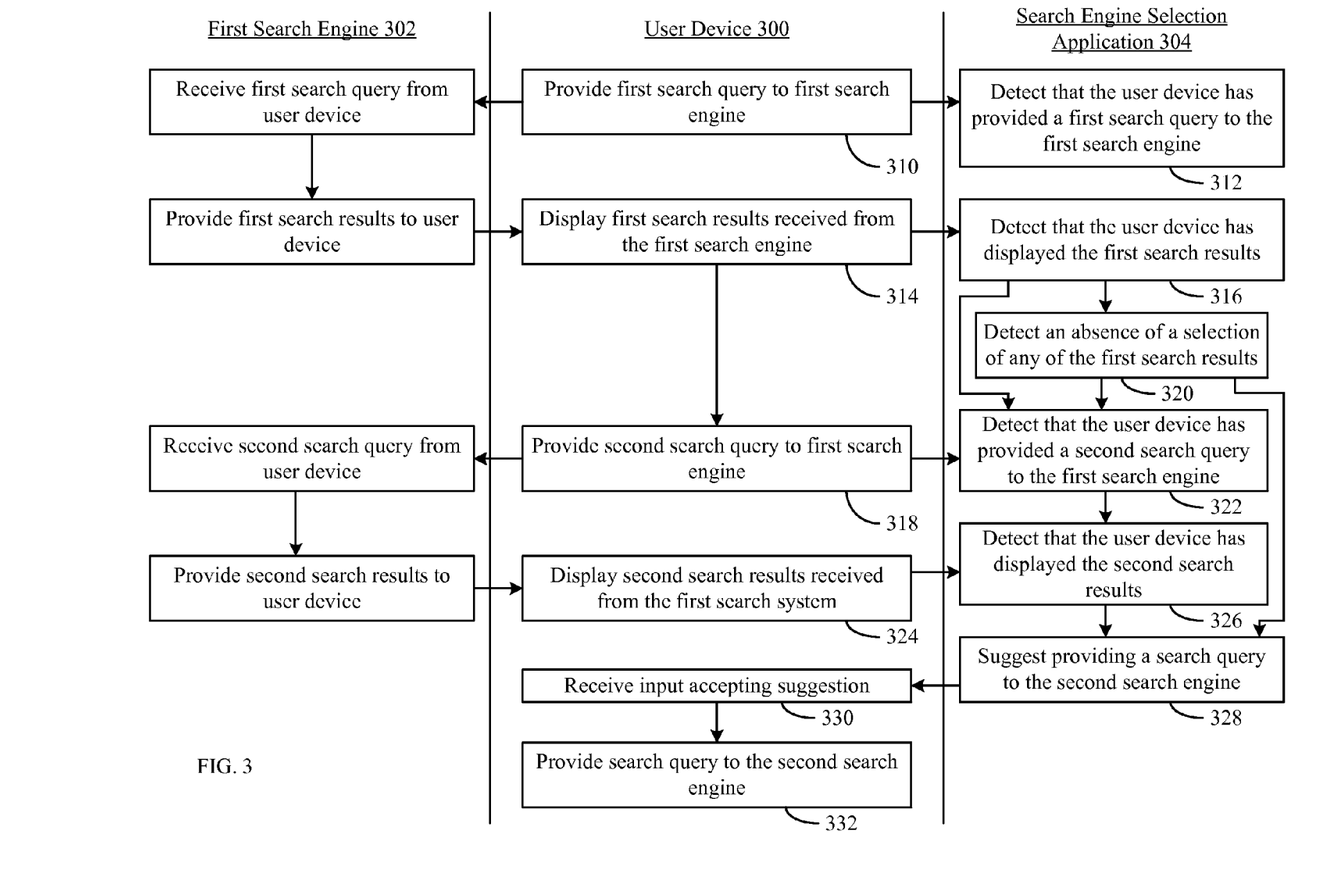
FIG. 3 shows example processes implemented by a user device to suggest using an alternative search engine to search for search results.

FIG. 3 shows example processes implemented by a user device 105 to suggest using an alternative search engine to search for search results. The processes can be implemented by a system of one or more computers that can be configured to perform particular operations or actions by virtue of having software, firmware, hardware, or combinations of them installed on the system that in operation causes or cause the system to perform the actions. One or more computer programs can be configured to perform particular operations or actions by virtue of including instructions that, when executed by data processing apparatus, cause the apparatus to perform the actions.

A user device 300 is connected to a first search engine 302. The user device 300 implements a search engine selection application 304 to determine if the first search engine 302 satisfies the user's informational need. The user device 300 provides a first search query to the first search engine at 310. The application 304 detects that the user device has provided the first search query to the first search engine at 312. The first search engine 302 receives the first search query from and provides first search results to the user device 300.

The user device 300 displays the first search results received from the first search engine 302 at 314. The application 304 detects that the user device has displayed the first search results at 316. The application 304 then detects one or more of search-related activities performed by the user. For example, the application 304 detects an absence of a selection of any of the first search results at 320.

The user device 300 provides a second search query to the first search engine at 318. The application 304 detects that the user device 300 has provided a second search query to the first search engine at 322. The first search engine 302 receives the second search query from and provides second search results to the user device 300.

The user device 300 displays the second search results received from the first search engine 302 at 324. The application 304 detects that the user device has displayed the second search results at 326. Either upon detecting an absence of a selection of any of the first search results (step 320) or upon detecting that the user device 300 has provided the second search query to the first search engine (step 322) or upon detecting that the user device has displayed the second search results (step 326), the application 304 can determine that the first search engine 302 does not satisfy the user's informational need and suggest providing a search query to the second search engine at 328. In some implementations, the application 304 can determine that the first search engine 302 does not satisfy the user's informational need after determining that the user provided multiple search queries and either did not selected any search result pertaining to any of the search queries or returned to continue to provide search queries despite accessing one or more search results. The user device 300 can receive input accepting the suggestion at 330, and provide the search query to the second search engine at 332.

Figure 4:
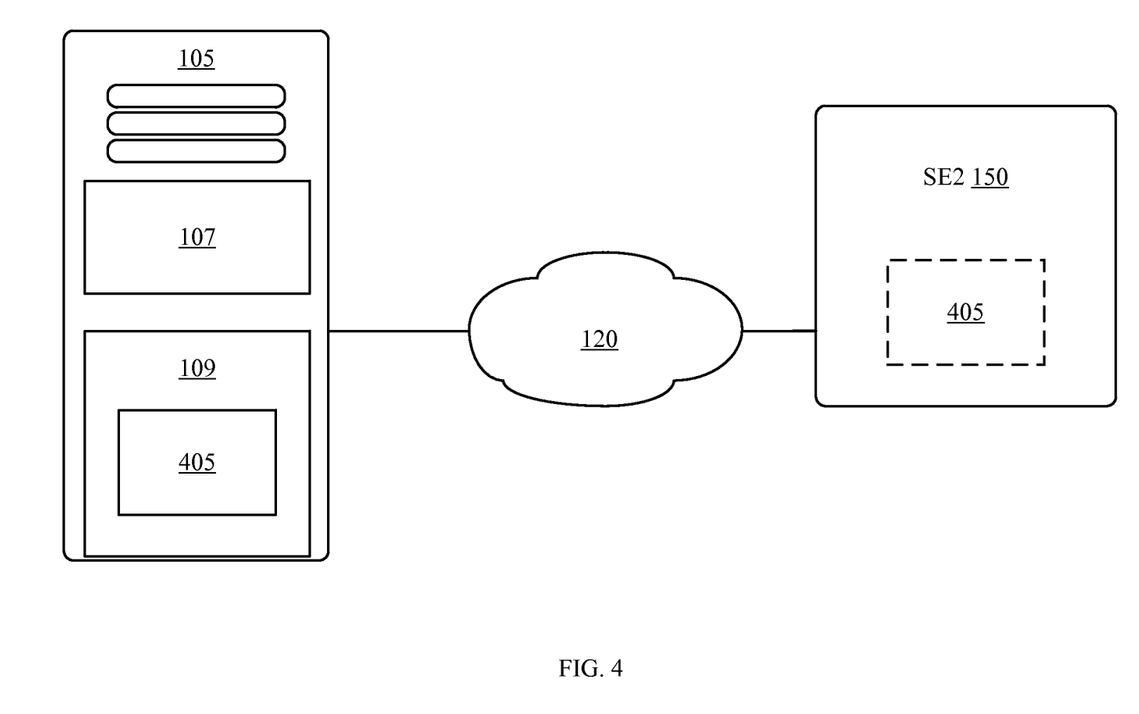
FIG. 4 shows an example search engine that stores suggested search queries for providing to a user device.

As described above, the suggestions that the user device displays can include search query suggestions 405. FIG. 4 shows an example search engine that stores suggested search queries for providing to a user device 105. When the suggestion to search using the second search engine 150 includes search query suggestions, then the user device 105 can retrieve from the database 405 one or more search query suggestions that pertain to the one or more search queries that the user device 105 provided to the first search engine 110. The user device 105 can display the retrieved search query suggestions in the user interface as selectable hyperlinks such that a selection of a search query suggestion causes the search query suggestion to be provided to the second search engine 150 as a search query.

In some implementations, the user device 105 can receive the database of search query suggestions 405 at the time of installing the user interface (for example, the web browser), and store the database 405, for example, on the computer-readable storage medium 109. To update the database 405, the user device 105 can periodically send requests for updates to and receive updates from the second search engine 150.

In alternative implementations, the database of search query suggestions 405 can be stored on the second search engine 150. In such implementations, the user device 105 initially obtains the user's permission to provide one or more search queries, which the user device provides to the first search engine 110, to the second search engine 150. If the user approves and if the user device 105 determines that the first search engine 302 does not satisfy the user's informational need, then the user device 105 transmits the search queries to the second search engine 150, receives search query suggestions that the second search engine 150 stores in the database 405. The user device 105 can display the received search query suggestions in the user interface.

Figure 5:
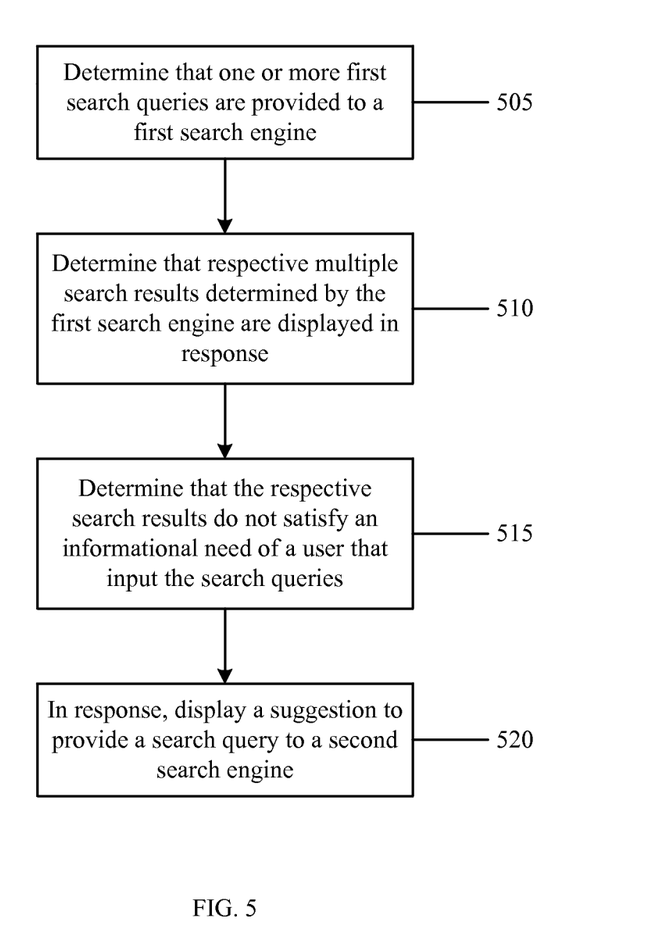
FIG. 5 is a flowchart showing an example process to suggest using an alternative search engine to search for search results.

FIG. 5 is a flowchart showing an example process 500 to suggest using an alternative search engine to search for search results. The process 500 can be implemented by a system of one or more computers that can be configured to perform particular operations or actions by virtue of having software, firmware, hardware, or combinations of them installed on the system that in operation causes or cause the system to perform the actions. The process 500 determines that one or more first search queries are provided to a first search engine at 505. The process 500 determines that respective multiple search results determined by the first search engine are displayed in response at step 510. The process 515 determines that the respective search results do not satisfy an informational need of a user that input the search queries at 515. In response, the process 500 displays a suggestion to provide a search query to a second search engine at 520.

Although the example implementations are described in the context of two example search engines, the search engine selection application 304 can be configured to suggest the use of multiple search engines. For example, if the second search engine does not provide results that satisfy the user's information needs, the application 304 can, in response to this determination, suggest a third search engine.

In some implementations, different corpora can be suggested within a search engine, based on similar techniques described above. For example, a user may be searching an image corpus, and the application 304 may determine than the search results for images that are being returned do not satisfy the user's information needs. In response, the application 304 may suggest a video corpus, or a text corpus, or some other specific resource corpus.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementations or of what may be claimed, but rather as descriptions of features specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   determining, at a user device, that one or more first search queries received in a user interface during a search session are provided to a first search engine;
   determining, at the user device, that for each of the one or more first search queries, a plurality of respective search results determined by the first search engine as satisfying the respective first search queries are displayed in the user interface;
   determining, at the user device, that the respective search results determined by the first search engine as satisfying the respective first search queries do not satisfy an informational need of a user that input the one or more first search queries at the user device; and
   in response to determining that the respective search results determined by the first search engine do not satisfy an informational need:
      displaying, in the user interface, a second search query and a third search query that is based on the first search queries, wherein the third search query is different from the second search query; and
      displaying, in the user interface, a message informing the user of an ability to submit either the second search query or the third search query to a second search engine.

2. The method of claim 1, wherein determining that the respective search results determined by the first search engine as satisfying the respective first search queries do not satisfy an informational need comprises determining an absence of a selection of any of the respective search results determined by the first search engine.

3. The method of claim 2, wherein determining the absence of the selection of any of the respective search results displayed in the user interface comprises detecting an absence of a selection of any of a plurality of identifiers displayed in the user interface, wherein an identifier is included in each search result and references a resource determined by the first search engine as satisfying the first search query.

4. The method of claim 1, wherein displaying a suggestion to provide the second search query to the second search engine comprises:
   displaying the second search query in the user interface; and
   displaying a message in the user interface that states that selection of the second search query will result in the second search query being provided to the second search engine.

5. The method of claim 1, wherein displaying a suggestion to provide the second search query to the second search engine comprises displaying the second search query in the user interface as a selectable hyperlink such that a selection of the hyperlink causes the second search query to be provided to the second search engine.

6. The method of claim 1, further comprising displaying each of the second search query and the third search query as a respective selectable hyperlink such that a selection of the hyperlink causes the respective search query to be provided to the second search engine.

7. The method of claim 1, further comprising obtaining the second search query and the third search query from a database of search queries stored on the user device.

8. The method of claim 1, further comprising:
   receiving input requesting that the second search query be submitted to the second search engine; and in response to receiving the input:
      providing the second search query to the second search engine, and
      displaying a plurality of search results received from and determined by the second search engine as satisfying the second search query in the user interface.

9. The method of claim 8, further comprising simultaneously displaying the plurality of respective search results determined by the first search engine as satisfying a first search query in the user interface with the plurality of search results received from and determined by the second search engine as satisfying the second search query.

10. The method of claim 1, wherein the second search query is a same query as one of the first search queries.

11. A non-transitory computer-readable storage medium storing computer program instructions executable by data processing apparatus to perform operations comprising:
   determining, at a user device, that one or more first search queries received in a user interface during a search session are provided to a first search engine;
   determining, at the user device, that for each of the one or more first search queries, a plurality of respective search results determined by the first search engine as satisfying the respective first search queries are displayed in the user interface;
   determining, by a computer at the user device, that the respective search results determined by the first search engine as satisfying the respective first search queries do not satisfy an informational need of a user that input the one or more first search queries at the user device; and
   in response to determining that the respective search results determined by the first search engine do not satisfy an informational need:
      displaying, in the user interface, a second search query and a third search query that is based on the first search queries, wherein the third search query is different from the second search query; and displaying, in the user interface, a message informing the user of an ability to submit either the second search query or the third search query to a second search engine.

12. The medium of claim 11, wherein determining that the respective search results determined by the first search engine as satisfying the respective first search queries do not satisfy an informational need comprises determining an absence of a selection of any of the respective search results determined by the first search engine.

13. The medium of claim 12, wherein determining the absence of the selection of any of the respective search results displayed in the user interface comprises detecting an absence of a selection of any of a plurality of identifiers displayed in the user interface, wherein an identifier is included in each search result and references a resource determined by the first search engine as satisfying the first search query.

14. The medium of claim 11, wherein displaying a suggestion to provide the second search query to the second search engine comprises:
 displaying the second search query in the user interface; and
 displaying a message in the user interface that states that selection of the second search query will result in the second search query being provided to the second search engine.

15. The medium of claim 11, wherein displaying a suggestion to provide the second search query to the second search engine comprises displaying the second search query in the user interface as a selectable hyperlink such that a selection of the hyperlink causes the second search query to be provided to the second search engine.

16. The medium of claim 11, further comprising displaying each of the second search query and the third search query as a respective selectable hyperlink such that a selection of the hyperlink causes the respective search query to be provided to the second search engine.

17. The medium of claim 11, further comprising obtaining the second search query and the third search query from a database of search queries stored on the user device.

18. The medium of claim 11, further comprising:
 receiving input requesting that the second search query be submitted to the second search query to the second search engine; and
 in response to receiving the input:
  providing the second search query to the second search engine, and
  displaying a plurality of search results received from and determined by the second search engine as satisfying the second search query in the user interface.

19. The medium of claim 18, further comprising simultaneously displaying the plurality of respective search results determined by the first search engine as satisfying a first search query in the user interface with the plurality of search results received from and determined by the second search engine as satisfying the second search query.

20. The medium of claim 11, wherein the second search query is a same query as one of the first search queries.

21. A system comprising:
 data processing apparatus; and
 a computer-readable storage medium storing computer program instructions executable by the data processing apparatus to perform operations comprising:
  determining, at a user device, that one or more first search queries received in a user interface during a search session are provided to a first search engine;
  determining, at the user device, that for each of the one or more first search queries, a plurality of respective search results determined by the first search engine as satisfying the respective first search queries are displayed in the user interface;
  determining, at the user device, that the respective search results determined by the first search engine as satisfying the respective first search queries do not satisfy an informational need of a user that input the one or more first search queries at the user device; and
  in response to determining that the respective search results determined by the first search engine do not satisfy an informational need:
   displaying, in the user interface, a second search query and a third search query that is based on the first search queries, wherein the third search query is different from the second search query; and
   displaying, in the user interface, a message informing the user of an ability to submit either the second search query or the third search query to a second search engine.

22. The system of claim 21, wherein determining that the respective search results determined by the first search engine as satisfying the respective first search queries do not satisfy an informational need comprises determining an absence of a selection of any of the respective search results determined by the first search engine.

23. The system of claim 22, wherein determining the absence of the selection of any of the respective search results displayed in the user interface comprises detecting an absence of a selection of any of a plurality of identifiers displayed in the user interface, wherein an identifier is included in each search result and references a resource determined by the first search engine as satisfying the first search query.

24. The system of claim 21, wherein displaying a suggestion to provide the second search query to the second search engine comprises:
 displaying the second search query in the user interface; and
 displaying a message in the user interface that states that selection of the second search query will result in the second search query being provided to the second search engine.

25. The system of claim 21, wherein displaying a suggestion to provide the second search query to the second search engine comprises displaying the second search query in the user interface as a selectable hyperlink such that a selection of the hyperlink causes the second search query to be provided to the second search engine.

26. The system of claim 21, further comprising displaying each of the second search query and the third search query as a respective selectable hyperlink such that a selection of the hyperlink causes the respective search query to be provided to the second search engine.

27. The system of claim 21, further comprising obtaining the second search query and the third search query from a database of search queries stored on the user device.

28. The system of claim 21, further comprising:
 receiving input requesting that the second search query be submitted to the second search query to the second search engine; and
 in response to receiving the input:

providing the second search query to the second search engine, and displaying a plurality of search results received from and determined by the second search engine as satisfying the second search query in the user interface.

29. The system of claim 28, further comprising simultaneously displaying the plurality of respective search results determined by the first search engine as satisfying a first search query in the user interface with the plurality of search results received from and determined by the second search engine as satisfying the second search query.

30. The system of claim 21, wherein the second search query is a same query as one of the first search queries.

* * * * *